US006865216B1

(12) United States Patent
Beamish et al.

(10) Patent No.: US 6,865,216 B1
(45) Date of Patent: Mar. 8, 2005

(54) FREQUENCY HOPPING SPREAD SPECTRUM MODULATION AND DIRECT SEQUENCE SPREAD SPECTRUM MODULATION CORDLESS TELEPHONE

(75) Inventors: Norman J. Beamish, Costa Mesa, CA (US); John S. Walley, Lake Forest, CA (US)

(73) Assignee: Skyworks Solutions Inc., Irvine, CA (US)

( * ) Notice: Subject to any disclaimer, the term of this patent is extended or adjusted under 35 U.S.C. 154(b) by 0 days.

(21) Appl. No.: 09/137,198

(22) Filed: Aug. 20, 1998

(51) Int. Cl.[7] .............................................. H04B 1/69
(52) U.S. Cl. ...................... 375/140; 375/130; 375/219; 375/295; 375/316
(58) Field of Search ................................ 375/130, 132, 375/133, 134, 135, 136, 137, 140, 141, 145, 146, 147, 149, 150, 219, 220, 295, 316, 329

(56) References Cited

U.S. PATENT DOCUMENTS

| 4,736,404 A | | 4/1988 | Anglikowski et al. |
| 4,760,586 A | | 7/1988 | Takeda |
| 4,815,121 A | * | 3/1989 | Yoshida .................... 379/88.01 |
| 4,864,599 A | | 9/1989 | Saegusa et al. |
| 5,228,026 A | | 7/1993 | Albrow et al. |
| 5,307,370 A | | 4/1994 | Eness |
| 5,363,402 A | | 11/1994 | Harmon |
| 5,444,770 A | * | 8/1995 | Davis et al. .............. 379/93.09 |
| 5,448,764 A | | 9/1995 | Sondermann et al. |
| 5,564,074 A | | 10/1996 | Juntti |
| 5,581,598 A | | 12/1996 | Hachiga |
| 5,887,020 A | * | 3/1999 | Smith et al. ................. 375/130 |
| 5,930,719 A | * | 7/1999 | Babitch et al. ............. 455/462 |
| 5,940,452 A | * | 8/1999 | Rich ........................... 375/347 |
| 6,061,385 A | * | 5/2000 | Ostman ..................... 375/130 |
| 6,115,411 A | * | 9/2000 | van Driest ................. 375/130 |
| 6,434,187 B1 | * | 8/2002 | Beard et al. ................ 375/219 |
| 6,732,163 B1 | * | 5/2004 | Halasz ....................... 709/220 |
| 2002/0054619 A1 | * | 5/2002 | Haas .......................... 375/133 |

FOREIGN PATENT DOCUMENTS

| WO | WO 96 38925 | 12/1996 | |
| WO | WO 96/38925 | * 12/1996 | ............ H04B/1/44 |
| WO | WO 98 26526 | 6/1998 | |

* cited by examiner

Primary Examiner—Tesfaldet Bocure
Assistant Examiner—Pankaj Kumar
(74) Attorney, Agent, or Firm—Knobbe Martens Olson & Bear

(57) ABSTRACT

A wireless transceiver capable of selectively receiving and transmitting as a direct sequence spread spectrum system or as a frequency hopping spread spectrum system is disclosed. The system is particularly suitable for use in a cordless telephone system. The transceiver includes components for both direct sequence spread spectrum transmission and reception and for frequency hopping spread spectrum transmission and reception.

22 Claims, 7 Drawing Sheets

DIGITAL SEQUENCE:   1      0      1      1      0

PHASE DIFFERENCE = $2\cos^{-1}m$

FREQUENCY HOPPING SPREAD SPECTRUM MODULATION AND DIRECT SEQUENCE SPREAD SPECTRUM MODULATION CORDLESS TELEPHONE

BACKGROUND OF THE INVENTION

I. Field of the Invention

The invention relates generally to communications. In addition, the invention relates to wireless telecommunications including cordless telephones.

II. Description of the Related Art

The cordless telephone has become a popular consumer good. The cordless telephone allows a user to untether himself from a wired connection to his local telephone line. Typically, a cordless telephone is comprised of two units: a base unit and a handset both of which are transceivers. The base unit connects to the public switched telephone network typically using a standard RJ-11 connector. The base unit provides a wireless connection to a handset. The handset is capable of receiving and transmitting signals over a wireless link to the base unit. The use of the wireless link allows the handset to communicate with the base unit.

Many cordless telephones operate as a time division duplex (TDD) system. In time division duplex, the base unit and the handset alternately transmit such that the units do not transmit at the same time. In a time division duplex system, the same frequency band can be used for both transmission and reception. By using time division duplex, the transmit and receive circuitry within each unit can share common components. In addition, each unit requires less internal isolation between the transmit and receive circuitry. For these reasons, a cordless telephone which operates using time division duplex can be cheaper, more reliable and yet produce higher quality audio signals than a full duplex unit. Even though the wireless link operates using time division duplex, audio compression techniques are used to provide concurrent bi-directional audio communication to the user. Therefore, even though the wireless link signals are time division duplex, the end user perceives simultaneous bi-directional audio communication.

In addition, cordless telephones typically use direct sequence spread spectrum (DSSS) modulation in conjunction with TDD. Spread spectrum signals used for the transmission of digital information are distinguished by the characteristic that their bandwidth is much greater than their information rate in bits per second. The large redundancy introduced by spread spectrum operation can be used to compensate for severe levels of interference. In addition, spread spectrum can be used to introduce pseudo-randomness into the signal. Transmission signals spread with a pseudo-random code appear to be random noise and are difficult to demodulate by receivers other than the intended receiver. In this way, a system which uses direct sequence spread spectrum is less vulnerable to accidental or deliberate reception by a third party. In this way, direct sequence spread spectrum, in conjunction with a scrambling scheme, provides a significant element of privacy in the communications channel between a handset and a base unit.

In a direct sequence spread spectrum system, data bits are modulated with a spreading sequence before transmission. Each bit of information is modulated with a series of chips from the spreading sequence. The number of chips per bit defines the processing gain. A greater number of chips per bit creates a greater immunity to noise and other interference. For example, in one common cordless telephone spreading technique, each information bit is modulated with a 12 bit spreading code. Because a cordless telephone using direct sequence spread spectrum has an enhanced immunity to noise and other interference, the cordless telephone handset may transmit a very low output power.

In a typical system, the spreading code might contain an even number of one's and zero's. In this way, the energy of the spread spectrum signal is minimized at and close to 0 Hz. For this reason, a baseband spread signal may be subjected to highpass or bandpass filtering with little effect on the information content. In a system in which each information bit is modulated with a 12 bit spreading code, a preferred spreading code can be chosen by examination of the spectral content of each possible 12 bit sequence which is comprised of six 0's and six 1's.

Prior to application of the spreading code to the information bit stream, the information bits may undergo a series of digital operations which further increase the performance of the system. For example, the information bits may undergo differential encoding in order to be more intolerant to an incorrect phase lock in the receiving unit phase locked loop (PLL). The information bits may be scrambled using a long scrambling sequence in order to further decrease the vulnerability of the system to interception.

Conventional cordless telephones utilizing direct sequence spread spectrum coding also use binary phase shift keying (BPSK). In a phase shift keyed system, information is carried in the phase of the signal. For example, in FIG. 1A, the binary sequence 1 0 1 1 0 is represented as a series of positive and negative voltage levels. In FIG. 1B, the same sequence has been phase shift keyed modulated. In FIG. 1B, two different phases are used to denote the two different digital values. Note that whenever the sequence transitions from a "1" to a "0" or from a "0" to a "1", the phase of the signal in FIG. 1B transitions. Such a system is referred to as a BPSK system.

FIG. 2 is a block diagram showing a prior art BPSK architecture. This architecture may be used by both the base unit and handset. A digital mixer 21 (contained within the digital architecture) receives the digital data produced by a digital portion of the architecture which is not shown in FIG. 2. The spreading code generator 22 supplies the spreading code to the other input of the mixer 21. The digital spread spectrum waveform output from the mixer 21 is converted to an analog signal by a one bit digital-to-analog converter (DAC) 62. The analog baseband signal is then amplified by a baseband amplifier 60. After amplification, the signal is passed through bandpass filter 58. The bandpass filter 58 is employed to remove higher order harmonics contained within the baseband spread spectrum signal in order to avoid transmitting out of band energy. In addition, the bandpass filter 58 attenuates signal energy at frequencies at or near 0 Hz. Attenuation of the low frequency components of the baseband signal aids in suppression of the radio frequency (RF) carrier frequency component of the radio output. In another embodiment of the system in FIG. 2 the bandpass filter 58 can be replaced with a lowpass filter.

The filtered output of the bandpass filter 58 is modulated with an RF carrier by a mixer 56. The RF carrier is generated by a phase lock loop comprised of a voltage control oscillator (VCO) 44, a lowpass filter 46 and a frequency mixer/phase detector 48. During operation, the mixer/phase detector 48 is programmed by the digital architecture to control the VCO 44 to generate an RF sinusoidal signal at the selected wireless link center frequency. The signal produced by the VCO 44 is applied to the mixer 56 such that the output of the mixer 56 is a BPSK waveform at the desired RF transmit frequency.

The RF BPSK waveform is amplified by an amplifier 54. In addition, the BPSK waveform is amplified by a variable gain power amplifier 50. The gain of the power amplifier 50 is set based upon a transmit power level indication received from the digital architecture and converted to usable form by a power amplifier level control unit 52. The gain of the power amplifier 50 at the transmitter may be decreased as the path loss between the handset and base unit is decreased in order to conserve power. During a transmission period of the time division duplex operation, an RF switch 22 connects the output of the power amplifier 50 to a radio frequency lowpass filter 20. The output of the lowpass filter 20 is transmitted to the receiving unit over an antenna.

During a reception period of the time division duplex operation, a receive signal passes through the lowpass filter 20. The radio frequency switch 22 connects the output of the lowpass filter 20 to an RF bandpass filter 24. The output of the bandpass filter 24 is passed to a variable gain low noise amplifier 26. The gain of the low noise amplifier 26 is selected by an LNA gain level indication generated by the digital architecture. The gain of the low noise amplifier is decreased as the path loss between the base unit and the handset decreases in order to avoid saturation of the receive circuitry. In order to discern the phase of the received signal at the baseband, the received RF signal is down converted using an in-phase and quadrature component of the RF signal produced by the phase lock loop. The RF signal produced by the phase lock loop is shifted by 90 degrees by a phase shifter 42 before use in the quadrature receive path. The in-phase and quadrature components are applied to the mixers 28A and 28B respectively. The output of the mixers 28A and 28B are passed to bandpass filters 30A and 30B, respectively. The output of bandpass filters 30A and 30B are passed to variable gain amplifiers 32A and 32B respectively. The gain of the variable gain amplifiers 32A and 32B is set by a baseband gain level indication received from the digital architecture to control the signal level supplied to subsequent components. The output of the variable gain amplifiers 32A and 32B is converted to a digital representation by analog-to-digital converters (ADCs) 34A and 34B.

The output of ADCs 34A and 34B is sent to matched filters 38A and 38B via a phase rotator 36. The phase rotator 36 attempts to compensate for any frequency offsets affecting the received baseband signal. Although both the transmitting and receiving units have a PLL, the carrier signal produced by the receiving unit is never exactly the same as the carrier signal produced by the transmitting unit due to injected noise, reference frequency variations and other sources of errors. Any difference between the transmitter and receiver carrier signals modulates the resulting baseband signal produced by the receiving unit. The phase rotator 36 attempts to detect and correct for errors due to frequency and phase offsets which modulate the baseband signal.

The matched filters 38A and 38B perform the despreading functions. The despreading function removes the direct sequence spread spectrum modulation from the received signal. The outputs of the matched filters 36A and 36B is input into a BPSK demodulator 40. The BPSK demodulator 40 uses the amplitude of the output of each matched filter 38A and 38B in order to recover the transmitted information bits from the received signal. A differential decoding stage may also be used if the information bits have been differentially encoded at the transmitter.

Cordless telephones employing direct sequence spread spectrum modulation and time division duplex typically provide a usable data rate of 100 kilobits per second in a full duplex communication link. The full duplex communication link provides for high quality voice communication. However, such a system has many limitations which make it unacceptable for data transmission. For example, the DSSS architecture makes it very difficult to increase the usable data rate due to restrictions in the amount of signal bandwidth available in the 902 MHz–928 MHz ISM (Industrial, Scientific and Medical) frequency band utilized by cordless telephones under FCC regulations. In addition, typical time division duplex schemes employed with cordless telephones allocate fixed, equal time intervals for transmitting and receiving for the handset and base unit. Such an inflexible approach is inefficient for data transmission. Therefore, current cordless telephone systems have many drawbacks for data communications.

SUMMARY OF THE INVENTION

A cordless telephone system incorporates both frequency hopping spectrum modulation and direct sequence spread spectrum modulation with the capability to switch between the two modulation techniques switching between the two modulation techniques can, for example be dependent on whether the cordless telephone system is transmitting data or voice.

In a cordless telephone system employing direct sequence spread spectrum modulation, increasing the data transmission rate requires increasing the bandwidth of the transmitted RF signal. Increasing the bandwidth requires changes to the radio frequency (RF) hardware (e.g., wider filter bandwidths, wider bandwidth power amplifiers). In addition, as the bandwidth of the DSSS signal increases to occupy a larger fraction of the frequency range allocated to cordless telephones, the probability of encountering interfering signals increases while the available number of channels for use with cordless telephones decreases. However, employing frequency hopping spread spectrum modulation allows for an increased data transmission rate within the currently available bandwidth. Such higher data transmission rates may be required, for example, for data communications such as are typically employed by personal computers communicating via the Internet.

One aspect of the present invention includes a cordless telephone system which employs DSSS modulation and can switch to FHSS modulation while employing much of the same hardware for both modulation techniques.

In one aspect of the present invention, a dual mode wireless transceiver includes a direct sequence spread spectrum transmitter portion, a frequency hopping spread spectrum transmitter portion and a mode selection circuit coupled to both a direct sequence spread spectrum transmission portion and the frequency hopping spread spectrum portion. The mode selection circuit selectively activates the direct sequence spread spectrum portion when in a direct sequence spread spectrum transmission mode and activates the frequency hopping spread spectrum transmission portion when in a frequency hopping spread spectrum transmission mode.

Another aspect of the present invention relates to a dual mode wireless transceiver which includes a frequency generator, a mixer, a spreading code generator selectively coupled to the mixer, a hopping sequence generator selectively coupled to the frequency generator, a modulating mixer coupled to receive the output of the first mixer and the frequency generator in a mode selection circuit coupled to the spreading code generator and the hopping sequence generator.

BRIEF DESCRIPTION OF THE DRAWINGS

The features, objectives and advantages of the invention will become more apparent from the detailed description set forth below when taken in conjunction with the drawings wherein like parts are identified with like reference numerals throughout and wherein.

DETAILED DESCRIPTION OF THE PREFERRED EMBODIMENT

In the situation where an increased data rate is required or desired for a cordless telephone, it is desirable to increase the bandwidth of the transmitted RF signal. In a DSSS cordless telephone system which already continuously occupies an expanded frequency bandwidth relative to the transmitted data rate, increasing the bandwidth requires changes to the RF hardware (e.g., wider filter bandwidths, wider bandwidth power amplifiers). Any such changes to the RF hardware are typically undesirable because they lead to either increased costs (if there are two hardware architectures to switch between) and/or reduced performance (if the same hardware is used for both configurations then one or other solution will be sub-optimal). Either of these effects is unacceptable in a consumer product such as a cordless telephone/data system where high quality performance and low costs are simultaneous requirements. Furthermore, as the bandwidth of the DSSS signal rises to occupy a larger fraction of the frequency range allocated by, for example, the Federal Communications Commission, the likelihood of encountering interfering signals rises, the available number of channels to operate in decreases and the potential for interfering with other users of the frequency band increases.

An alternative method of achieving a higher transmitted data rate using the existing DSSS cordless telephone system is to switch off the spreading and despreading operations at the transmitter and receiver and to transmit raw data. The raw data rate can be chosen to be higher than the underlying DSSS data rate by anything from a factor of one up to a factor equal to the processing gain of the spread spectrum code. Within this constraint the same RF hardware can be used in each case (DSSS voice and raw data). However, the various signal impairments encountered in a typical RF channel in which cordless telephone systems are expected to operate makes this method of transmitting raw data unreliable.

The performance and quality of the raw data transmission is improved significantly when a frequency hopping signal is employed. This can be accomplished by the frequency generated by the frequency synthesizer being changed at defined intervals equal to the dwell time. The resulting hybrid system then has the capability to select either DSSS voice signal transmission or FHSS high rate data signal transmission using the same RF hardware. All that is required is that there be provided a switching mechanism within the digital control architecture to choose between the two options.

Figure 3:
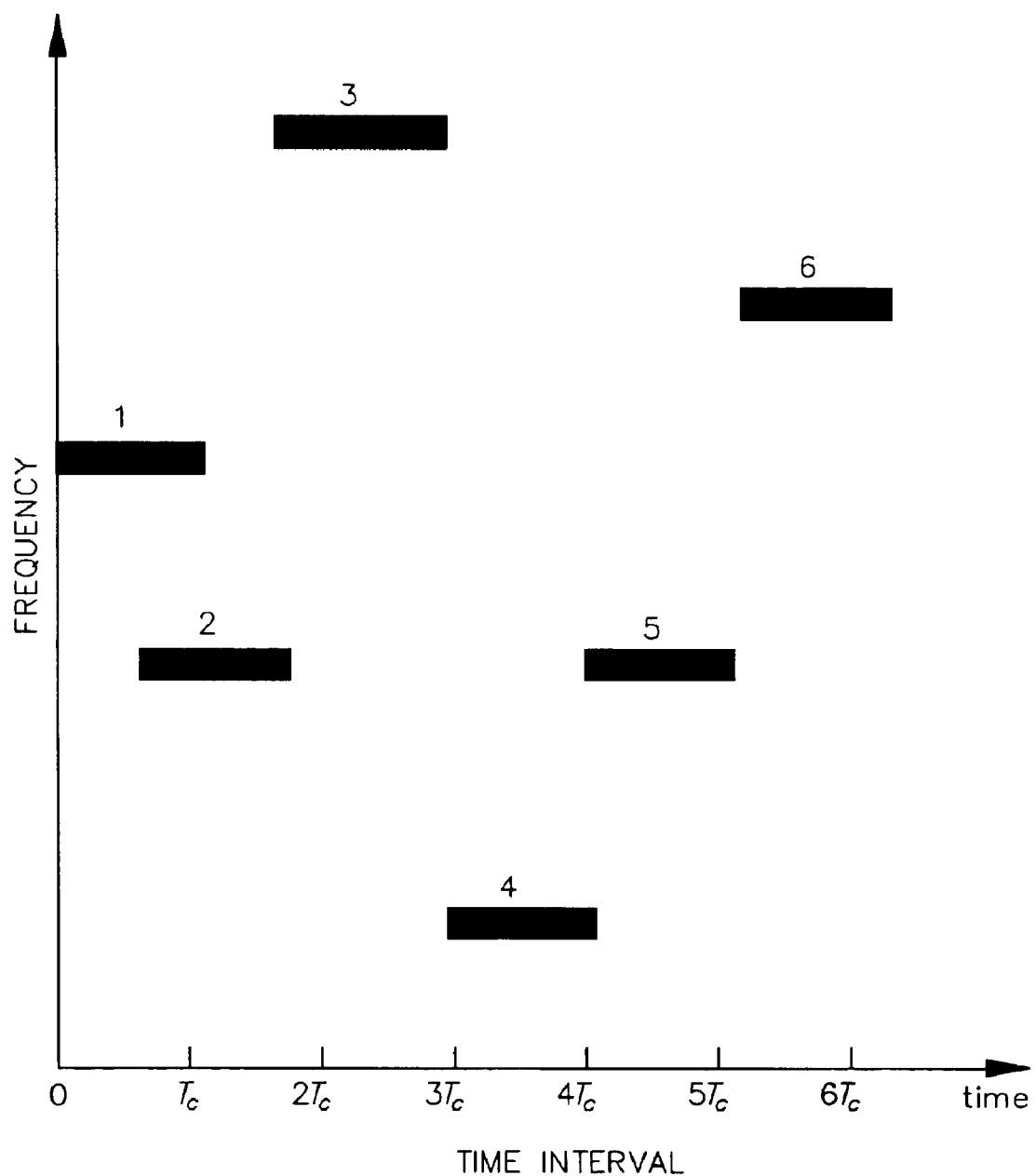
FIG. 3 is a graphical representation in a time-frequency plane of a frequency-hopping transmission pattern.

In a frequency-hopping spread spectrum (FHSS) communications system, the available channel bandwidth is subdivided into a number of (usually contiguous) frequency slots. In any signaling interval, the transmitted signal occupies one or more of the available frequency slots. Referring to FIG. 3, a particular frequency-hopping pattern is illustrated in a time-frequency plane. During a first time interval, $T_c$ (also referred to as the dwell time) the communication system transmits in a first frequency slot. During the second time interval from $T_c$ to $2T_c$, the signal transmitted by the system occupies a second frequency slot and so on. This can be contrasted with a DSSS system wherein the transmission occupies the same bandwidth during each time interval. The selection of the frequency slots in an FHSS system can be made pseudo-random. In a cordless phone system, whether each time interval is a transmit or receive period depends upon the conventions used in the system.

Figure 4:
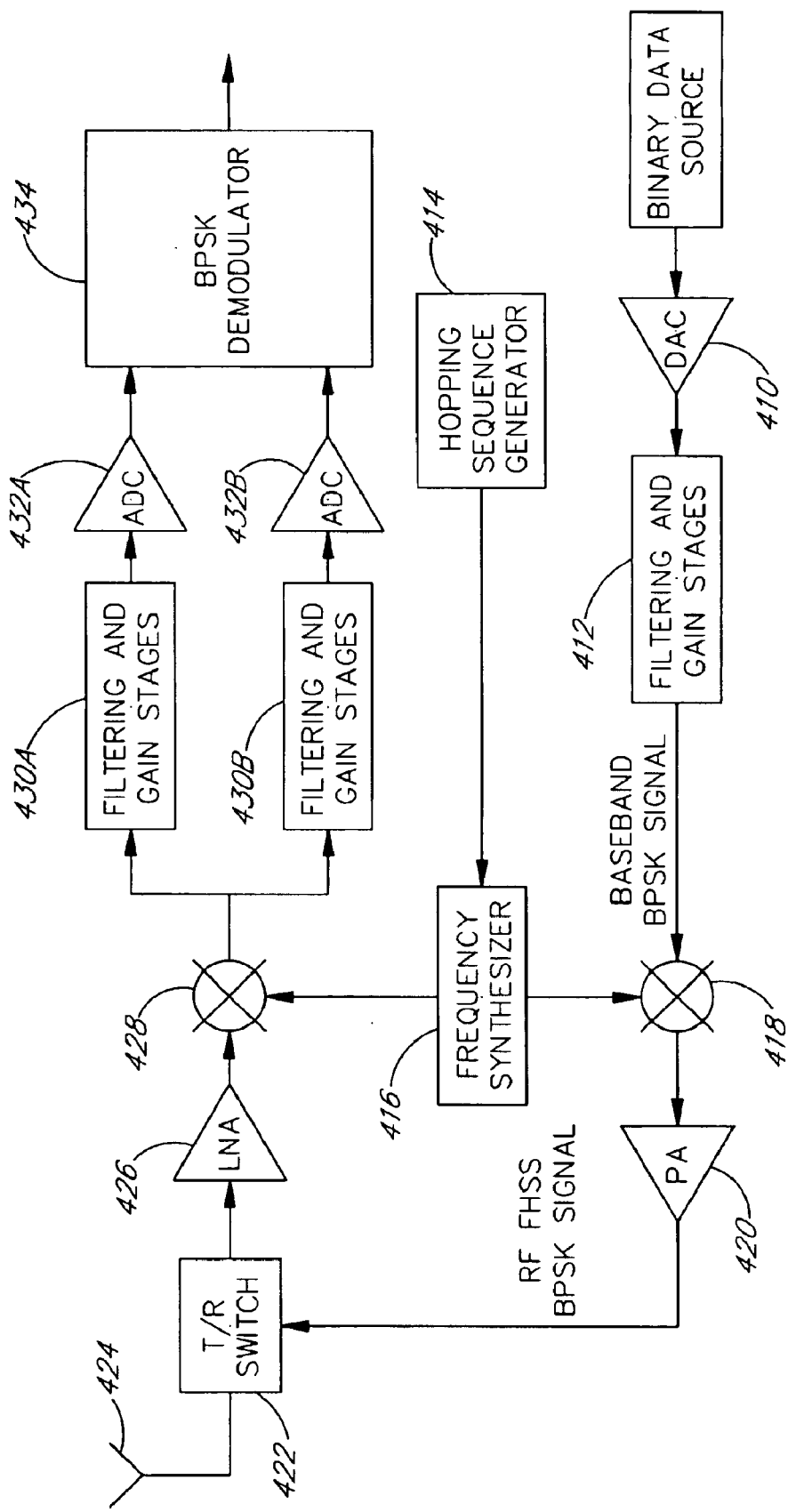
FIG. 4 is a block diagram of a transmitter and receiver for a frequency-hopping spread spectrum system.

FIG. 4 is a block diagram of a transmitter and receiver for a frequency-hopped spread spectrum system. During a transmit interval, a digital source signal which is produced by a digital portion of the architecture not shown in the figure, is applied to a one-bit digital to analog converter (DAC) 410. The output of the digital to analog converter 410 is then applied to the appropriate filtering and gain stages represented by block 412. The hopping sequence generator controls the frequency synthesizer 416 which then generates the center frequency of the channel for the signaling interval. In other words, the hopping sequence generator 414 generates the pattern of the frequency slots or channels. The output of the frequency synthesizer is then mixed with the output of the filtering and gain stages 412 by the mixer 418. The output of the mixer 418 is then amplified by power amplifier 420 and sent through the transmit receive switch 422 out to the antenna 424.

During a receive interval, a signal received in the antenna 424 passes through the transmit/receive switch 422 to a low noise amplifier 426. The amplified signal is then mixed at mixer 428 which removes the carrier signal. Obviously, the hopping sequence generator 414 of the receiver must be synchronized with the hopping sequence generator of the transmitter. The output of the mixer 428 is then passed to filtering and gain stages 430A and 430B. The outputs of the filtering and gain stages 430A and 430B are then each passed to analog to digital converters 432A and 432B. The digital outputs of the analog to digital converters 432A and 432B are then supplied to BPSK demodulator circuitry 434 which recovers the transmitted information bits from the received signals. A differential decoding stage may also be used if the information bits have been differentially encoded at the transmitter.

Figure 5:
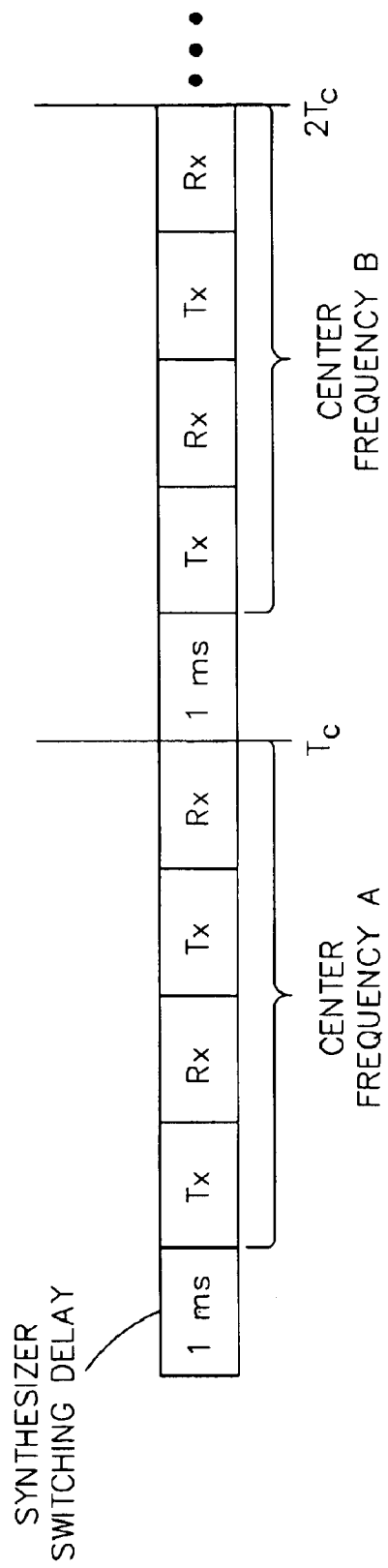
FIG. 5 is a graphical representation of a frame timing structure.

FIG. 5 shows a frame timing structure for an FHSS communication system suitable for use with cordless telephones. In the timing diagram during a first dwell time, the system transmits on a channel represented by center frequency A. Prior to transmitting at center frequency A, a finite settling time is required to permit the frequency synthesizer to complete the transition from the previous frequency to the new frequency A. During this settling interval data transmission is not possible. In one embodiment, during the dwell time $T_c$, there is a first transmit period (Tx) followed by a reception period (Rx) followed then by a second transmission and reception period. That pattern is then repeated at the next channel represented by center frequency B. Such a framing structure employing equal periods for transmitting and receiving is generally used for full duplex voice transmission which requires symmetric data rates for transmitting and receiving. However, for full duplex voice transmission an FHSS system with such a framing structure is less efficient than the DSSS system described above due to the overhead cost of the synthesizer settling time. In another embodiment the dwell time may be equal to the transmit period and the overhead of the synthesizer settling interval consumes an even greater portion of the time available for data transmission. Reducing the portion of the dwell time occupied by synthesizer settling time requires that the dwell time be increased. This has the effect of reducing the hopping rate of the FHSS system and thereby reducing the performance improvement due to frequency hopping. Therefore, for a cordless telephone providing voice communication a DSSS solution is preferable to an FHSS solution for voice transmission.

Figure 6:
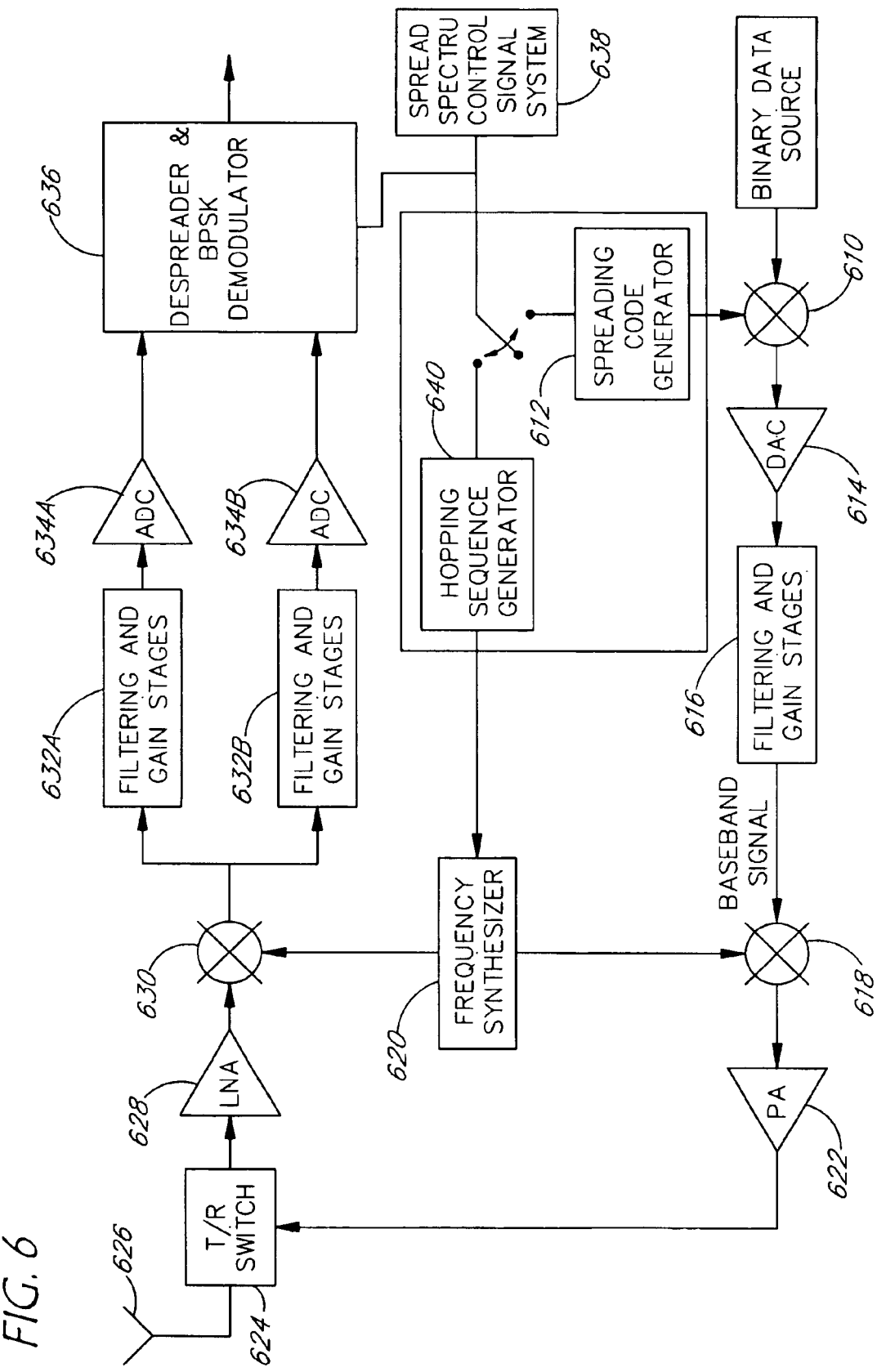
FIG. 6 is a block diagram of a frequency-hopping spread spectrum modulation and direct sequence spread spectrum modulation transmit and receive circuitry.

Referring now to the block diagram of FIG. 6, the frequency-hopping spread spectrum (FHSS) modulation and direct sequence spread spectrum (DSSS) modulation transmit and receive circuitry for a cordless telephone handset and base station will be described.

Figure 1A:
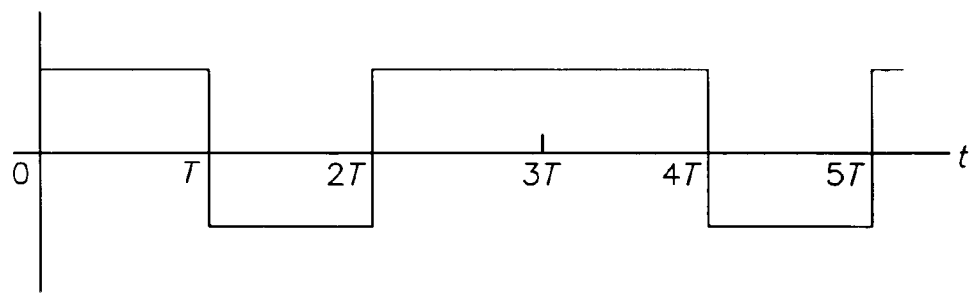
FIGS. 1A and B are time domain diagrams illustrating in FIG. 1A a binary transmission sequence and illustrating in FIG. 1B the same sequence which has been phase shift keyed modulated.
Figure 1B:
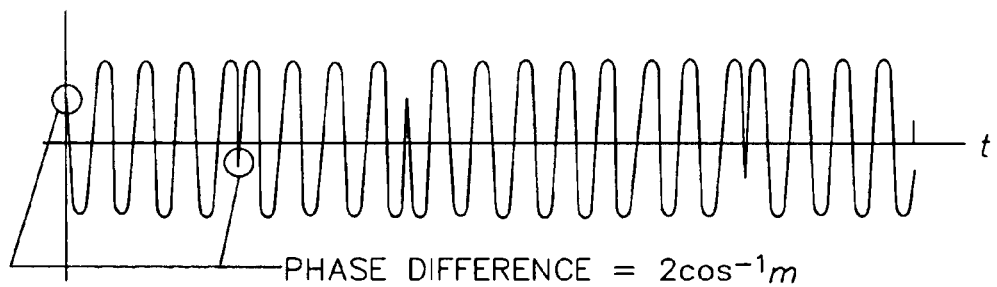
Figure 2:
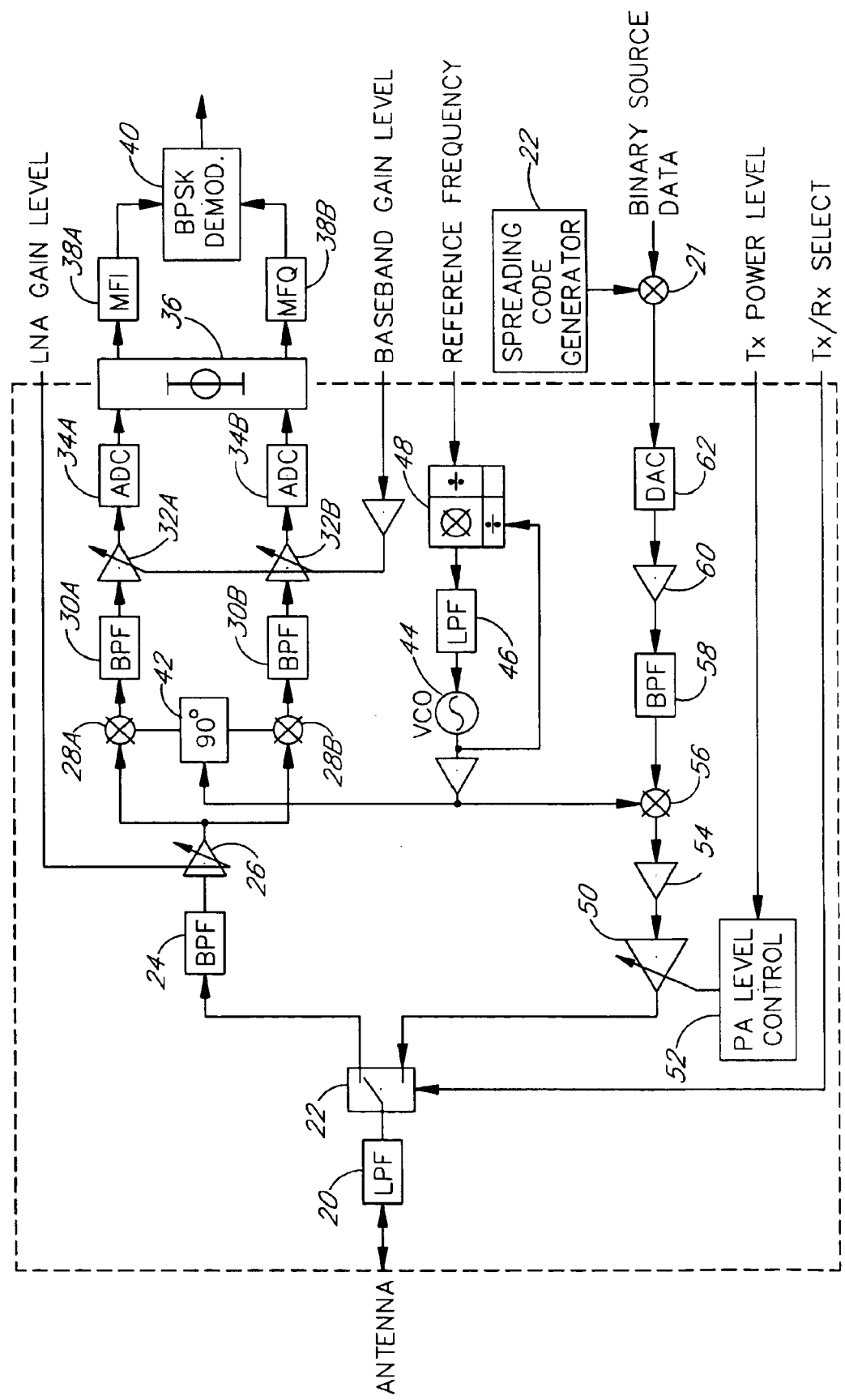
FIG. 2 is a block diagram showing a prior art binary phase shift keyed architecture of a DSSS cordless telephone handset or base unit.

Binary source data which is produced by a digital portion of the architecture not shown in the figure, is applied to a spreading code mixer 610, which may be a digital mixer. When the transceiver is operating as a DSSS transmitter, the mixer 610 also receives the spreading code from the spreading code generator 612. When the transceiver is operating as an FHSS transmitter, the spreading code is not provided to mixer 610 and the binary source data passes through the mixer. The output of the mixer 610 is supplied to a digital to analog converter 614, which may be a one bit digital to analog converter. The analog output of the digital to analog converter 614 is applied to appropriate filtering and gain stages represented by block 616. Appropriate filtering and gain circuitry is known to those of ordinary skill in the art and one example was described previously with regard to FIG. 2. The output of the filtering and gain stages 616, referred to as the base band signal, is provided to a modulating mixer 618. The mixer 618 receives a frequency output from the frequency generator 620, which can be a frequency synthesizer, as its other input. The frequency synthesizer can be a phase lock loop comprised of a voltage controlled oscillator, a lowpass filter and a frequency mixer/phase detector as was described above with regard to FIG. 2. The output of the mixer is then amplified by a power amplifier 622 and sent through the transmit receive switch 624 to the antenna 626.

When a signal is received by antenna 626 it passes through the transmit/receive switch 624 to the low noise amplifier 628. The amplified signal is passed to the demodulation portion of the system beginning with a demodulator mixer 630. The mixer 630 also receives an input from the frequency synthesizer 620. The mixer 630 acts to remove the carrier signal. The output from the mixer 630 is applied to filtering and gain stages 632*a* and 632*b*. The output from the filtering and gain stages are applied to two analog to digital converters 634*a* and 634*b*. The digital outputs of the analog to digital converters are supplied to the despreader and BPSK demodulator 636. The despreader and BPSK demodulator 636 demodulates the BPSK signal, and if appropriate, despreads the signal.

The spread spectrum control signal system 638, or mode selection circuit, controls the application or use of the spreading code generator 612, a hopping sequence generator 640 and controls the application of the despreader in the despreader and BPSK demodulator 636. The spread spectrum control signal system can be implemented, for example, as a switch or as a circuit configured to respond to signals from external equipment such as a modem would communicate over the cordless telephone. When the system is operating as a DSSS system, the spread spectrum control signal system 638 deactivates the hopping sequence generator 640 and the frequency synthesizer 620 generates the center frequency of the communication channel being used. In addition, in DSSS mode the spread spectrum control signal system 638 activates the spreading code generator so that the spreading code is supplied as an input to the mixer 610. Finally, the spread spectrum control signal system 638 activates the despreader in the despreader and BPSK demodulator circuitry 636.

When the system is operating as an FHSS system, the spread spectrum control signal system 638 deactivates the spreading code generator 612 such that the binary source data passes through mixer 610 directly to the digital to analog converter 614. In addition, the spread spectrum control signal system 638 activates the hopping sequence generator 640 which supplies the hopping sequence to the frequency synthesizer 620. Finally, in FHSS mode, the spread spectrum control signal system 638 deactivates the despreader in the despreader and BPSK demodulator 636.

The spread spectrum control signal system 638 can be implemented as a switch to be operated by the user to set the cordless telephone and base station to either operate as a DSSS system or an FHSS system. Alternatively circuitry can be provided which recognizes whether the transmissions occurring in the cordless phone system are voice or data and automatically switches the system to operate as a DSSS system or an FHSS system respectively.

In addition, Applicant notes that instead of incorporating BPSK modulation, the system can be implemented utilizing continuous phase, frequency shift keying (CPFSK) modulation such as is described in pending application Ser. No. 09/107,733 filed Jun. 30, 1998, titled "Direct Conversion Time Division Duplex Radio, Direct Sequence Spread Spectrum Cordless Telephone" and is hereby incorporated by reference.

Figure 7:
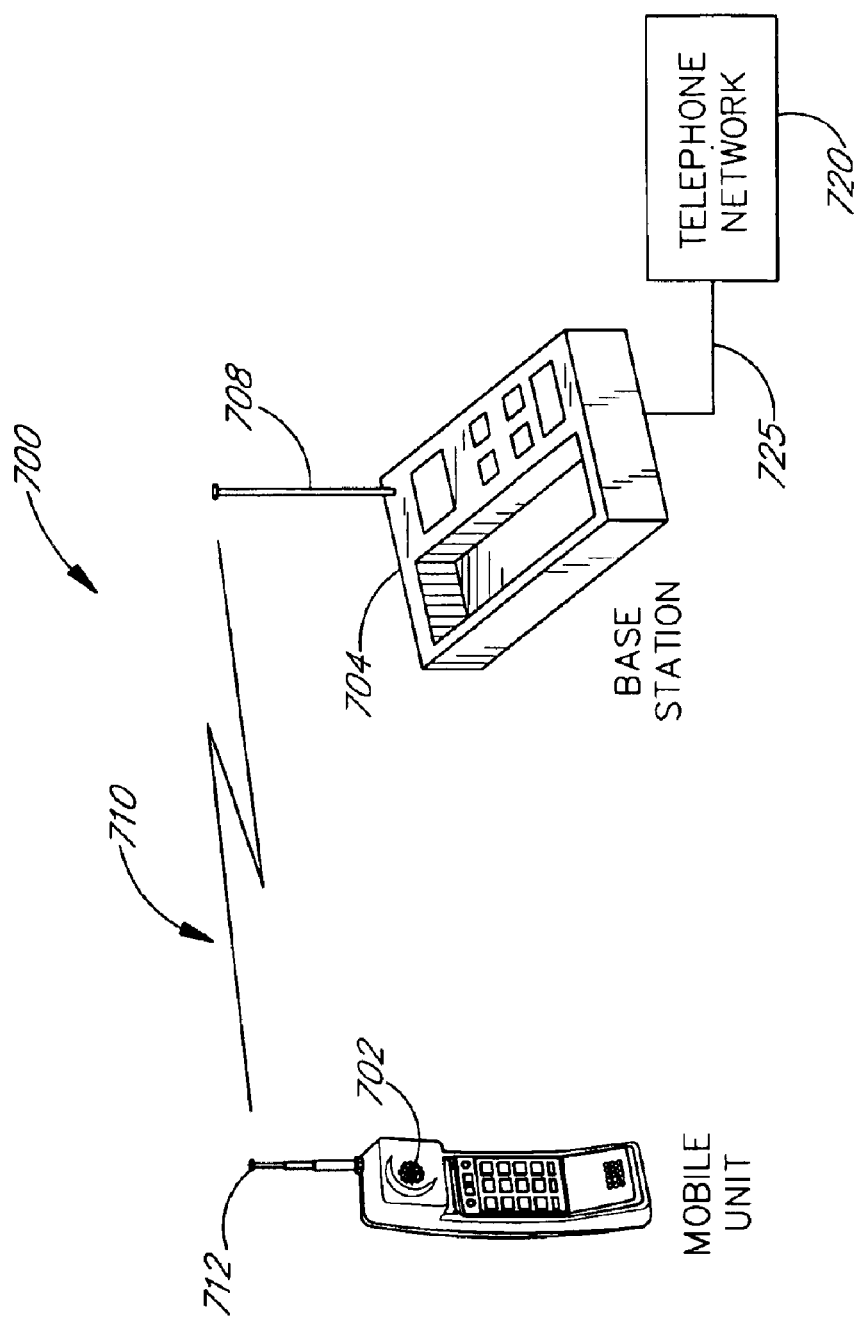
FIG. 7 is an exemplary cordless telephone incorporating the transmit and receive circuitry of the present invention.

FIG. 7 illustrates an exemplary cordless telephone system 700 incorporating the present invention. The cordless telephone system has a mobile unit 702, a base unit 704 which communicate with radio communication 710 via antennae 708, 712. Typically, the base station 704 couples to a telephone network 720 via a telephone line 725.

The invention may be embodied in other specific forms without departing from its spirit or essential characteristics. The described embodiments is to be considered in all respects only as illustrative and not restrictive and the scope of the invention is, therefore, indicated by the appended claims rather than by the foregoing description. All changes which come within the meaning of equivalency of the claims are to be embraced within their scope.

What is claimed is:

1. A dual mode wireless transceiver comprising:
   a direct sequence spread spectrum transmitter portion with a first data transmission rate;
   a frequency hopping spread spectrum transmitter portion with a data transmission rate that is greater than said first data transmission rate;

a mode selection circuit coupled to said direct sequence spread spectrum transmission portion and to said frequency hopping spread spectrum transmission portion and configured to
  detect when the transceiver is transmitting a voice transmission and in response thereto to selectively activate said direct sequence spread spectrum portion and to deactivate said frequency hopping spread spectrum transmission portion and
  detect when the transceiver is transmitting a data transmission and in response thereto to selectively activate said frequency hopping spread spectrum transmission portion and to deactivate said direct sequence spread spectrum transmitter portion; and
a receiver portion capable of receiving and demodulating both direct sequence spread spectrum modulated signals and frequency hopping spread spectrum modulated signals.

2. The dual mode wireless transceiver of claim 1, wherein said direct sequence spread spectrum transmitter portion comprises a spreading code generator selectively mixed with an input signal.

3. The dual mode wireless transceiver of claim 2, further comprising a frequency generator and wherein said frequency hopping spread spectrum transmitter portion further includes a hopping sequence generator selectively coupled to said frequency generator.

4. The dual mode wireless transceiver of claim 2, further comprising a spreading code mixer for mixing the output of said spreading code generator and the input signal.

5. The dual mode wireless transceiver of claim 4, further comprising a modulating mixer coupled to receive the output of said spreading code mixer and said frequency generator.

6. The dual mode wireless transceiver of claim 1, wherein said receiver portion selectively receives a spreading code from said direct sequence spread spectrum transmitter portion.

7. The dual mode wireless transceiver of claim 1, wherein said receiver portion selectively receives a demodulation frequency signal from said frequency hopping spread spectrum transmitter portion.

8. A dual mode wireless transceiver configured to transmit a transmission, comprising:
  a frequency generator;
  a spreading code mixer;
  a spreading code generator capable of generating a spreading code and selectively coupled to said spreading code mixer;
  a frequency hopping sequence generator capable of generating a hopping sequence and selectively coupled to said frequency generator;
  a modulating mixer coupled to receive the spreading code of said spreading code mixer and an output of said frequency generator;
  a spread spectrum control signal system including circuitry configured to recognize whether the transmission is voice or data and
    when the transmission is voice, to disconnect said frequency hopping sequence from said frequency generator and to couple said spreading code to said spreading code mixer in a first transmission mode with a first transmission rate and
    when the transmission is data, to disconnect said spreading code from said spreading code mixer and to couple said frequency hopping sequence to said frequency generator in a second transmission mode with a transmission rate greater than said first transmission rate; and
  a demodulation portion coupled to receive the output of said frequency generator.

9. The dual mode wireless transceiver of claim 8, wherein said demodulation portion is coupled to selectively receive the spreading code of said spreading code generator.

10. The dual mode wireless transceiver of claim 8, wherein said a spreading code mixer is a digital mixer.

11. The dual mode wireless transceiver of claim 8, wherein said frequency generator is a phase locked loop.

12. The dual mode wireless transceiver of claim 11, wherein the phase locked loop includes a voltage controlled oscillator, a lowpass filter and a frequency mixer/phase detector.

13. A cordless telephone dual mode wireless transceiver comprising:
  a direct sequence spread spectrum transmitter means for modulating an input signal as a direct sequence spread spectrum signal;
  a frequency hopping spread spectrum transmitter means for modulating the input signal as a frequency hopping spread spectrum signal; and
  a mode selection means coupled to said direct sequence spread spectrum transmitter means and to said frequency hopping spread spectrum transmitter means and configured to
    detect when the input signal is voice, and in response thereto to selectively activate said direct sequence spread spectrum transmitter means, to deactivate said frequency hopping spread spectrum transmitter means, and to transmit said input signal as a direct sequence spread spectrum signal, and
    detect when the input signal is data, and in response thereto to selectively activate said frequency hopping spread spectrum transmitter means, to deactivate said direct sequence spread spectrum transmitter means, and to transmit said input signal as a frequency hopping spread spectrum signal.

14. The cordless telephone dual mode wireless transceiver of claim 13, wherein said direct sequence spread spectrum transmitter means includes a spreading code generator.

15. The cordless telephone dual mode wireless transceiver of claim 14, further including a frequency generator and wherein said frequency hopping spread spectrum transmitter means further includes a hopping sequence generator selectively coupled to said frequency generator.

16. The cordless telephone dual mode wireless transceiver of claim 14, further including a spreading code mixer for mixing the output of said spreading code generator and the input signal.

17. The cordless telephone dual mode wireless transceiver of claim 16, further including a modulating mixer coupled to receive the output of said spreading code mixer and said frequency generator.

18. A dual mode wireless transceiver comprising:
  a direct sequence spread spectrum transmitter portion with a first data transmission rate;
  a frequency hopping spread spectrum transmitter portion with a data transmission rate that is greater than said first data transmission rate; and
  a mode selection circuit coupled to the direct sequence spread spectrum transmission portion and to the frequency hopping spread spectrum transmission portion, wherein the mode selection circuit is configured to detect when the transceiver is transmitting a voice transmission and in response thereto to selectively activate the direct sequence spread spectrum portion and to deactivate the frequency hopping spread spectrum transmission portion, and detect when the transceiver is transmitting a data transmission and in response thereto to selectively activate the frequency hopping spread spectrum transmission portion and to deactivate the direct sequence spread spectrum transmitter portion.

19. The dual mode wireless transceiver of claim 18 wherein the direct sequence spread spectrum transmitter portion comprises a spreading code generator, wherein the spreading code generator generates a spreading code.

20. The dual mode wireless transceiver of claim 18 further comprising a frequency generator and wherein the frequency hopping spread spectrum transmitter portion further includes a hopping sequence generator selectively coupled to the frequency generator.

21. The dual mode wireless transceiver of claim 19 further comprising a spreading code mixer for mixing the spreading code and an input signal.

22. The dual mode wireless transceiver of claim 21, further comprising a modulating mixer coupled to receive an output of the spreading code mixer and the frequency generator.

* * * * *

UNITED STATES PATENT AND TRADEMARK OFFICE
CERTIFICATE OF CORRECTION

| | |
|---|---|
| PATENT NO. | : 6,865,216 B1 |
| APPLICATION NO. | : 09/137198 |
| DATED | : March 8, 2005 |
| INVENTOR(S) | : Norman J. Beamish et al. |

Page 1 of 1

It is certified that error appears in the above-identified patent and that said Letters Patent is hereby corrected as shown below:

At column 2, line 1, please delete "WO WO 96 38925 12/1996". (Entry repeated)

At column 10, line 10, in claim 10, after "said" please delete "a".

Signed and Sealed this

Ninth Day of January, 2007

JON W. DUDAS
*Director of the United States Patent and Trademark Office*